United States Patent
Thomas

(10) Patent No.: US 7,091,148 B2
(45) Date of Patent: *Aug. 15, 2006

(54) SILICIOUS CLAY SLURRY

(75) Inventor: Ronald J Thomas, Paris, TN (US)

(73) Assignee: H.C. Spinks Clay Company, Inc., Paris, TN (US)

(*) Notice: Subject to any disclaimer, the term of this patent is extended or adjusted under 35 U.S.C. 154(b) by 36 days.

This patent is subject to a terminal disclaimer.

(21) Appl. No.: 10/898,742

(22) Filed: Jul. 26, 2004

(65) Prior Publication Data

US 2005/0032631 A1 Feb. 10, 2005

Related U.S. Application Data

(60) Provisional application No. 60/493,891, filed on Aug. 9, 2003.

(51) Int. Cl.
*C04B 33/04* (2006.01)
*C04B 33/28* (2006.01)

(52) U.S. Cl. ..................... 501/141; 501/144

(58) Field of Classification Search ........... 501/141, 501/143–149
See application file for complete search history.

(56) References Cited

U.S. PATENT DOCUMENTS

| | | | |
|---|---|---|---|
| 4,024,412 A | 5/1977 | MacAskill, Jr. | |
| 4,144,084 A | 3/1979 | Abercrombie, Jr. | |
| 4,317,849 A * | 3/1982 | Ogura et al. | 427/362 |
| 4,327,189 A | 4/1982 | Crutchfield | |
| 4,568,392 A | 2/1986 | Dawson | |
| 4,647,381 A | 3/1987 | Fong | |
| 4,647,832 A | 3/1987 | Fenne | |
| 4,741,838 A | 5/1988 | Sharpe, Jr. | |
| 4,781,298 A | 11/1988 | Hemstock | |
| 4,812,247 A | 3/1989 | Fahner | |
| 4,812,248 A | 3/1989 | Marwick | |
| 4,812,427 A | 3/1989 | Kohut | |
| 4,812,428 A | 3/1989 | Kohut | |
| 4,817,446 A | 4/1989 | Kanamori | |
| 4,880,759 A | 11/1989 | Kohut | |
| 4,888,315 A * | 12/1989 | Bowman et al. | 501/144 |
| 5,036,599 A | 8/1991 | Thompson | |
| 5,096,733 A | 3/1992 | Vallyathan | |
| 5,153,155 A | 10/1992 | Kohut | |
| 5,223,463 A * | 6/1993 | Bilimoria et al. | 501/146 |
| 5,332,499 A | 7/1994 | Spencer | |
| 5,403,793 A | 4/1995 | Tsuchiya | |
| 5,433,372 A | 7/1995 | Mellul | |
| 5,707,912 A | 1/1998 | Lowe | |
| 5,730,836 A | 3/1998 | Greig | |
| 5,779,785 A | 7/1998 | Payton | |
| 6,171,506 B1 | 1/2001 | Allen | |
| 6,537,363 B1 | 3/2003 | Golley | |
| 6,696,377 B1 | 2/2004 | Thomas | |
| 2002/0109216 A1 | 8/2002 | Matsuzaki | |

* cited by examiner

*Primary Examiner*—Karl Group
(74) *Attorney, Agent, or Firm*—Howard J. Greenwald

(57) ABSTRACT

A clay slurry with a solids content of at least about 60 weight percent and a casting rate of at least 60 grams per hour, wherein the slurry contains from about 68 to about 74 weight percent of silica and less than about 0.8 percent of carbon. At least about 9 weight percent of the particles in the slurry are larger than about 44 microns, and at least about 5 weight percent of the particles in said slurry are larger than about 74 microns.

31 Claims, 6 Drawing Sheets

SILICIOUS CLAY SLURRY

CROSS-REFERENCE TO RELATED PATENT APPLICATION

This patent application claims priority based upon applicant's provisional patent 60/493,891, filed on Aug. 9, 2003.

FIELD OF THE INVENTION

A stable silicious clay slurry with a solids content of at least about 60 weight percent and a casting rate of at least 60 grams per hour, wherein said slurry contains from about 68 to about 74 weight percent of silica (by dry weight of total solids) and less than about 0.8 percent of carbon, wherein at least about 9 weight percent of the particles in said slurry are larger than about 44 microns, and wherein at least about 5 weight percent of the particles in said slurry are larger than about 74 microns.

BACKGROUND OF THE INVENTION

U.S. Pat. Nos. 4,812,247 and 4,812,248 of William Kohut describe a stable ball clay slurry that contained from about 50 to about 65 weight percent (by weight of dry ball clay) of silica. In the "comparative examples" discussed in such patents (see, e.g., comparative examples 10–89 of U.S. Pat. No. 4,812,427, at columns 39 et seq.), a discussion was presented of certain slurries made from clays with a silica content of 72 weight percent. Referring to columns 43 and 44 of U.S. Pat. No. 4,812,427, and in the examples 16, 17, 18, and 19 thereof, slurries made from clays containing 72 weight percent of silica were unstable, having a settling index of 0.11, 0.18, 0.16, and 0.18, respectively. By comparison, the stable ball clay slurry of U.S. Pat. No. 4,812,427 had a settling index of at least 0.9; but the maximum allowable silica content for such slurry was 65 percent. It is an object of this invention to make a clay slurry with a silica content of at least 68 percent wherein such slurry is stable and has properties suitable for slip casting.

SUMMARY OF THE INVENTION

In accordance with this invention, there is provided stable silicious clay slurry with a solids content of at least about 60 weight percent and a casting rate of at least about 60 grams per hour, wherein said slurry contains from about 68 to about 74 weight percent of silica (by dry weight of total solids) and less than about 0.8 weight percent of carbon, wherein at least about 9 weight percent of the particles in said slurry are larger than about 44 microns, and wherein at least about 5 weight percent of the particles in said slurry are larger than about 74 microns.

BRIEF DESCRIPTION OF THE DRAWINGS

The invention will be described by reference to the enclosed drawings, in which like numerals refer to like elements, and wherein.

DESCRIPTION OF THE PREFERRED EMBODIMENTS

Figure 1:
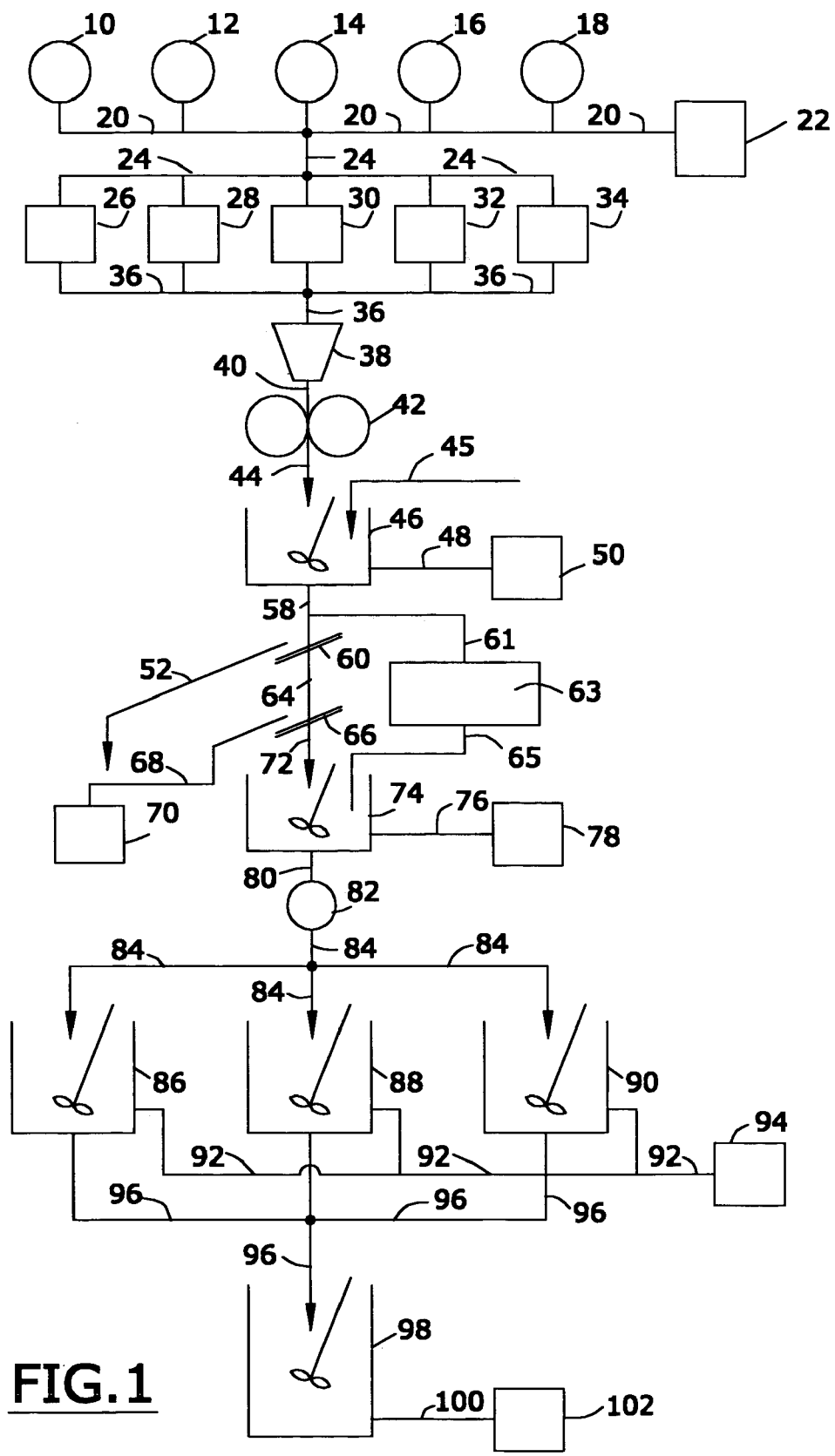
FIG. 1 is a flow diagram illustrating one preferred process of the invention.

The preferred slurry of this invention is stable, i.e., it does not settle appreciably. This property may be measured by using the "settling index" test described in U.S. Pat. No. 4,812,427, the entire disclosure of which is hereby incorporated by reference into this specification. As is disclosed in this patent, "This test is used to determine the stability of the slurry to resist the settling of particles out of suspension due to gravity. The gel structure developed in the slurry must be sufficient to prevent such settling. A high value of settling index means that very little setting has occurred. The settling index of the ball clay slurry is measured by a test in which a half-gallon sample of the slurry is first mixed for 2 minutes on a Lightning V-7 Mixer ("Lightning Mixer") which is manufactured by the Mixing Equipment Company of Rochester, N.Y. Thereafter, a sample of the mixed slurry is weighed out and put into a small aluminum container. The container is then placed in an oven set at 80 degrees Centigrade and allowed to dry for about 16 hours. The weight of the dried sample is then determined, and the initial solids content of the slurry is then calculated."

As is also disclosed in U.S. Pat. No. 4,812,427, "Thereafter, a half-gallon sample of the slurry is mixed for two minutes on the Lightning Mixer. A cylindrical polyvinyl chloride tube which is 11.0 inches long and has an inside diameter of 54.4 millimeters is used. The bottom portion of the tube is covered with a small cap, and 600 ml. of slurry is poured into the tube. The tube is then sealed at the top with "Saran Wrap" to prevent evaporation. The filled tube is then placed upright in a 4.0? deep water in a "Blue M Magni Whirl Constant Temperature Bath" (manufactured by the Blue M Electric Company of Blue Island, Ill); the apparatus is set at a temperature of 35 degrees centigrade with a four second pulse duration and frequency. The tube of slurry is then allowed to settle undisturbed in the bath for 10 days. After ten days in the bath, the tube of slurry is removed from the bath and placed upright in a conventional freezer for about 16 hours. Thereafter, it is removed from the freezer and rotated under a stream of hot water to slightly melt the outer surface of the slurry so that the cap can be removed and the slurry pushed out of the tube. The clyinder of slurry removed from the tube is sampled—a one inch sample is cutt off from each of the top and the bottom of the sample using a common backsaw. Each of the one-inch samples is then placed in separate 400 milliliter beakers of known weights. Each of the filled beakers is weighed, placed in an oven set at 80 degrees centigrade, and allowed to dry for 16 hours. The weight of each of the one-inch samples is then calculated from this data. The settling index is equal to the solids content of the top one-inch sample (in percent) divided by the solids content of the bottom one-inch sample (in percent) ."

As is also disclosed in U.S. Pat. No. 4,812,427, "A settling index of 1.0 indicates the same solids content on top and bottom, i.e., no settling has occurred."

In one embodiment, the settling index of the silicious slurry of this invention is at least about 0.5. In another embodiment, the settling index of such slurry is at least about 0.6. In yet another embodiment, the settling index of such slurry is at least about 0.7. In yet another embodiment, the settling index of such slurry is at least about 0.8.

The slurry of this invention preferably has a solids content of at least about 60 weight percent. One may measure the solids content of a slurry by conventional means such as, e.g., the means disclosed in U.S. Pat. Nos. 4,812,427 and 4,812,428, the entire disclosure of each of which is hereby incorporated by reference into this specification. Thus, by way of illustration and not limitation, one may measure the specific gravity of the slurry and thereafter calculate the solids content of the slurry based upon the average density of the particles in the slurry; in the case of ball clay slurries (and also kaolin slurries), the particle density is often about 2.60 grams per cubic centimeter. By way of further illustration, reference may be had, e.g., to U.S. Pat. No. 4,144,084 (method of controlling the viscosity of dispersed clay slurries); U.S. Pat. No. 4,741,838 (high solids mineral slurries); U.S. Pat. Nos. 4,647,832; 4,781,298 (high solids content clay slurries); U.S. Pat. No. 5,036,599 (slurried kaolin); U.S. Pat. Nos. 5,707,912; 5,730,836 (evaporative concentration of clay slurries); U.S. Pat. No. 5,779,785 (smectite slurries); U.S. Pat. Nos. 6,171,506; 6,537,363; and the like. The entire disclosure of each of these United States patents is hereby incorporated by reference into this specification.

In one embodiment, the solids content of the slurry is from about 60 to about 66 percent. In another embodiment, the solids content of the slurry is from about 62 to about 65 percent.

The slurry of this invention preferably has a casting rate of at least about 60 grams per hour. The casting rate of the slurry may be determined by conventional means such as, e.g., the means disclosed at column 15 of U.S. Pat. No. 4,812,427, the entire disclosure of which is hereby incorporated by reference into this specification. "As is disclosed in such column 15, "The casting rate of the ball clay slurry is determined by a test in which a 300 cubic centimeter sample of the slurry, at a solids content of 60 dry weight percent of slurry, is filter pressed through a Whatman 2.5 micron No. 5 filter paper with 98 percent retention above 2.5 microns in an NL Baroid Series 300 Standard API Filter Press (manufactured by NL Industries of Houston, Tex.) at 30 pounds per square inch for 60 minutes, the filter press is then drained for five minutes, and the filter cake is weighed. The casting ratio is equal to the number of grams (wet weight) in the filter cake after 60 minutes."

In one preferred embodiment, the slurry of this invention is comprised of at least about 68 weight percent of silica, dry weight, by dry weight of total solids in the slurry. The concentration of silica in the slurry may be determined by conventional means such as, e.g., the means described in U.S. Pat. No. 4,812,427, the entire disclosure of which is hereby incorporated by reference into this specification. As is disclosed, e.g., at column 8 of this patent, "The silica content of the ball clay is determined by standard elemental oxide analysis for clays, using atomic absorption analysis; the test described in the 'Alumina content of the ball clay' definition is equally applicable here. This silica content includes that fraction within the mineralogical structure of the clay minerals themselves as well as the free quartz minerals associated with the ball clays." At the same column 8 of this patent, the test for determining the alumina content of the clay is defined as follows: "The amount of alumina in the ball clay is determined by atomic absorption analysis, using the Perkin-Elmer Model 2380 Atomic Absorption Spectrophotometer, manufactured by the Perkin-Elmer Corporation of Norwalk, Conn. National Bureau of Standards clay standards SRM 98a and 99a are used, and the test is conducted in substantial accordance with the manual for model 2380 entitled "Analytical Methods for Atomic Absorption Spectrphotometry. In order to put the ball clay into solution for the atomic absorption analysis, a fusion method is used. In this fusion method, the following steps are involved: 1. 0.1 grams of oven-dried clay are placed in a 25 ml. platinum crucible with its cover. 0.5 grams of lithium metaborate are added to the clay and mixed with it with a small glass or polypropylene rod until the mixture is relatively homogeneous. Thereafter, the mixture is fused at 1000 degrees centrigrade for from about 10 to about 15 minutes . . . 2. The crucible is then removed from the oven and allowed to air cool to below red heat. The bottom of the crucible is then quickly quenched in distilled water. The fusion is inspected to insure that there are no signs of pieces of fired clay and that the entire mass is clear. . . . 3. The crucible is then place din a 100 ml. tall beaker. To this is added 60 ml. of hot water, the magnetic stirring bar is dropped in, and stirring is begun. Eitehr 2 ml. of nitric acid or 5 ml. of concentrated hydrochloric acid is added. If nitric acid is used, the solution will remain clear. If hydrochloric acid is used, the solution may have a slightly yellow color. . . . 4. The placement of the magnetic stirring bar may have to be altered several times to effect dissolution of the fusion in the side of the crucible. Dissolution should be complete in about 15 minutes."

It is preferred that the slurry contain from about 68 to about 74 weight percent of silica, by weight of dry ball clay. In one embodiment, the slurry contains at least about 70 weight percent of silica. In another embodiment, the slurry contains at least about 72 weight percent of silica.

In one preferred embodiment, the slurry of this invention contains less than about 0.8 weight percent of carbon, by total dry weight of solids. Means for measuring carbon in a slurry are well known and are described, e.g., in U.S. Pat. Nos. 4,024,412; 4,327,189; 4,568,392; 4,647,381 (high solids mineral slurries); U.S. Pat. No. 5,433,372 (stable high solids slurries); U.S. Pat. No. 6,696,377 (clay slurry); and the like. The entire disclosure of each of these United States patents is hereby incorporated by reference into this specification.

In one embodiment, a sample of the slurry is dried at a temperature of 100 degrees Celsius until it has a moisture content of less 0.2 weight percent. Thereafter, from about 0.2 to about 0.5 grams of the dried solid material is preferably tested for carbon content in a Leco SC-444 carbon/sulfur analyzer (manufactured by the Leco Corporation of 3000 Lakeview Avenue, St. Joseph, Mich. 49085) using a temperature of 1,450 degrees Celsius in an atmosphere of oxygen.

In one preferred embodiment, the carbon content of the slurry, as measured as described above, is less than about 0.6 weight percent.

In one preferred embodiment, the slurry has a particle size distribution such that at least 9 percent of the particles in such slurry are larger than about 44 mcrons, and at least 5 percent of the particles in such slurry are larger than about 74 microns. The particle size distribution of such slurry may be measured, e.g., in accordance with the procedure described at column 10 of U.S. Pat. No. 4,812,427, the entire disclosure of which is hereby incorporated by reference into this specification. Thus, and referring to such column 10, " The particle size distribution of the ball clay can be measured in accordance with the following methods: 1. In view of the manner in which clay particles fracture, clay particles will have irregular shapes which, however, are of a body (or maximum side-to-side thickness) such that sub-sieve sized discrete particles will pass through a specified mesh of a sieve. The size of the discrete particles can be expressed in terms of a spherical diameter through which a clay particle from a sample of clay or clay/water slurry will pass. One can use U.S. Series sieves down to about 270 mesh or 53 microns. 2. A Micromeritics Sedigraph Model 5000ET (made by the Micromeritics Company, Norcross, Ga. may be used to measure the particle size distribution of the clay material in the ball clay/water slurry. A 0.3 percent solution of "Lomar D" (the sodium salt of a condensed mono naphthalene sulfonic acid sold by Diamond Shamrock Chemical Company of Morristown, N.J.) can be used. The Lomar D solution is made by weighing 3.0 grams of Lomar D and placing it in a one-liter flask; the flask is then filled up to the mark with distilled water. Approximately 4 grams (dry weight) of ball clay is placed in 50 milliliters of the dilute Lomar D solution and mixed in an English microcup for ten minutes. The slurry is then cooled to 32 degrees Celsius and pumped into the Sedigraph for analysis. 3. Specific surface area can be measured by nitrogen adsorption using the well known BET equation. This measurement can be conducted on a Micromeritics "Flow Sorb II 2300," model 2300/00000/00 (made by Micromeritics Company). The test procedure is described in the instruction manual for this machine (see, e.g., Manual P/N: 230/42804/00, published by Micromeritics in 1985). 4. Wet sieve analysis of ball clay may be conducted in accordance with A.S.T.M. test C-325-81." As will apparent, other analytical means also may be used for this and other purposes. Reference may be had, e.g., John P. Sibilia's "A Guide to Materials Characterization and Chemical Analysis" (VCH Publishers, Inc., New York, N.Y., 1998). Reference may also be had to John A. Dean's "Analytical Chemistry Handbook (McGraw-Hill, Inc., New York, N.Y., 1995). Reference also may be had, e.g., to T. Allen's "Particle Size Measurement" (Chapman and Hall, London, 1981).

In one preferred embodiment, the slurry has a particle size distribution such that at least 10 percent of the particles in such slurry are larger than about 44 microns, and at least 6 percent of the particles in such slurry are larger than about 74 microns.

In one preferred embodiment, the slurry of this invention has a loss upon ignition (LOI) of from about 5.0 to about 8.0 percent. In another embodiment, the slurry of this invention has a loss on ignition of from about 5.6 to about 7.8 percent. Loss on ignition may be determined by conventional means such as, e.g., the means described in U.S. Pat. No. 4,812,427. Thus, e.g., one may use standard A.S.T.M. test C323-56(1995), "Test Methods for Chemical Analysis of Ceramic Whiteware Clays" (see section 8).

In one preferred embodiment, the slurry of this invention contains less than about 10 weight percent of fractured silica, by total weight, dry basis, of the solids in the slurry.

In another embodiment, the slurry contains less than about 5 weight percent of fractured silica, by total weight, dry basis, of the solids in the slurry. In yet another embodiment, the slurry contains less than about 1 weight percent of fractured silica. In yet another embodiment, the slurry contains less than about 0.1 weight percent of fractured silica.

The term fractured silica is well known to those skilled in the art. Reference may be had, e.g., to U.S. Pat. Nos. 5,096,733 and 5,403,793, to published patent application US 20020109216, and to European patent publication EP0521470. The entire disclosure of each of these patent publications is hereby incorporated by reference into this specification.

Fractured silica is discussed, e.g., in U.S. Pat. No. 5,096,733, the entire disclosure of which is hereby incorporated by reference into this specification. As is disclosed in this United States patent, "Studies have suggested that freshly fractured silica may exhibit surface reactivity not found in aged silica. Hochstrasser and Antinini (7) reported that silicon-based radicals could be generated upon cleavage of a quartz crystal under ultra-high vacuum ($10^{-10}$ mm Hg). Karmanova and colleagues (8) reported release of singlet oxygen from silica dust upon heating, whereas Kolbanev and associates (9) reported generation of $H_2O_2$ from the reaction of freshly ground silica with water. In addition, Marasas and Harington (10) reported that silica exhibits oxidant properties that may be related to its pathogenicity." In support of these statements, the patentees cite articles by G. Hochstrasser et al., "Surface states of pristine silica surfaces (Surface Sci, 1972: 644–646), by E. V. Karmanova et al. ("Mechanism of the emission of singlet oxygen molecules from a disordered quartz surface," Zhurnal Fizichestoi Khimii, 58: 1958–1961, 1984), and by L. W. Marass et al. ("Some oxidative and hydroxylative action of quartz . . . ," Nature, 188:1173–1174, 1960).

Experiments with Freshly Ground and Weathered Silicas

In the experiments described in this portion of the specifications, two silica-containing samples were evaluated. One of the samples contained "ground silica;" and the other of the samples contained "weathered silica."

The "ground silica" was a silica sand that was sold by the Unimin Corporation of New Canaan, Conn. Silica sand is typically produced by a process in which it is first mined, initially ground, washed, subjected a "fine grinding," and then classified. This product is hereafter identified as "C3859."

The "weathered silica" was obtained from a mineral deposit near Gleason, Tenn. from the Richmond Mine. The sample was taken from a sand seam at the Richmond mine. The sample was then analyzed by sieve analysis and separated into five(5) distinct sieve fractions. These fractions were a +80 mesh fraction, a −80+120 mesh fraction, a −120+170 mesh fraction, a −170+230 mesh fraction, and −230+325 mesh fraction; these are collectively referred to hereinafter as the "S6770" sample.

Thereafter, the "ground silica" (C3859), and the weathered silica (S6770) samples were analyzed for elongation, roundness, aspect ratio, and symmetry, in accordance with the optical microscopy procedure described below.

In one preferred embodiment, the aspect ratio for each sample was evaluated. The "aspect ratio" describes the degree to which a shape deviates from being circular. A shape with an aspect ratio near unity is nearly circular, while a shape with a large aspect ratio is long and narrow.

The mean aspect ratios of the silica samples were determined using an optical microscope. The aspect ratio of the particles is defined as the maximum thickness divided by the minimum thickness of the particle. Thicknesses are defined as the distance between any two tangents parallel to the edge of a particle, with the maximum and minimum values of these being relevant.

The procedure used for these analyses is applicable to powders that are coarse enough to be visible in an optical microscope, with an approximate lower limit of 5 microns average diameter. The optical microscope used was an Olympus BH-2 polar optical microscope. A digital camera was attached to the microscope to obtain digital micrographs; the system used was an Olympus DP12.

Image processing software, entitled "Fovea Pro 3.0," was used; this software was obtained from Reindeer Graphics, Inc. of Asheville, N.C. It is described as being a "16 Bit Image Processing and Analysis Tools for Adobe Photoshop . . . " (see http://www.reindeergrpahics.com/ foveapro). This software was part of "The Image Processing Toolkit" that is available from Reindeer Graphics, Inc.

For each powder sample, an image of the sample was acquired using the microscope. Care was taken to insure that the particles were spaced and not overlapping in the image and that they displayed good relief and high contrast.

The image of each powder was opened with Adobe Photoshop (obtained from Adobe Systems, Inc. of San Jose, Calif.). Thereafter, the image was digitally processed to remove the background from the image, such that only the particle themselves remained in the image. to remove the background from the image, such that only the particles themselves remain in the image. Thereafter, using the "Fovea Pro 3.0" and the "Adobe Photoshop" software, calculations were conducted regarding the shapes f the particles, their dimensions, their roundness, their convexity, etc. Some of the results of these calculations are shown in Table 1.

of less than about 0.6 in the range from 45 to 63 microns. It is even more preferred, in this embodiment, that less than about 1 percent of such silica have a roundness of less than about 0.6 in the range of form about 45 to about 63 microns. It should be noted that, in the range of from about 45 to about 63 microns, the weathered silica has a roundness of greater than about 0.65.

Figure 5:
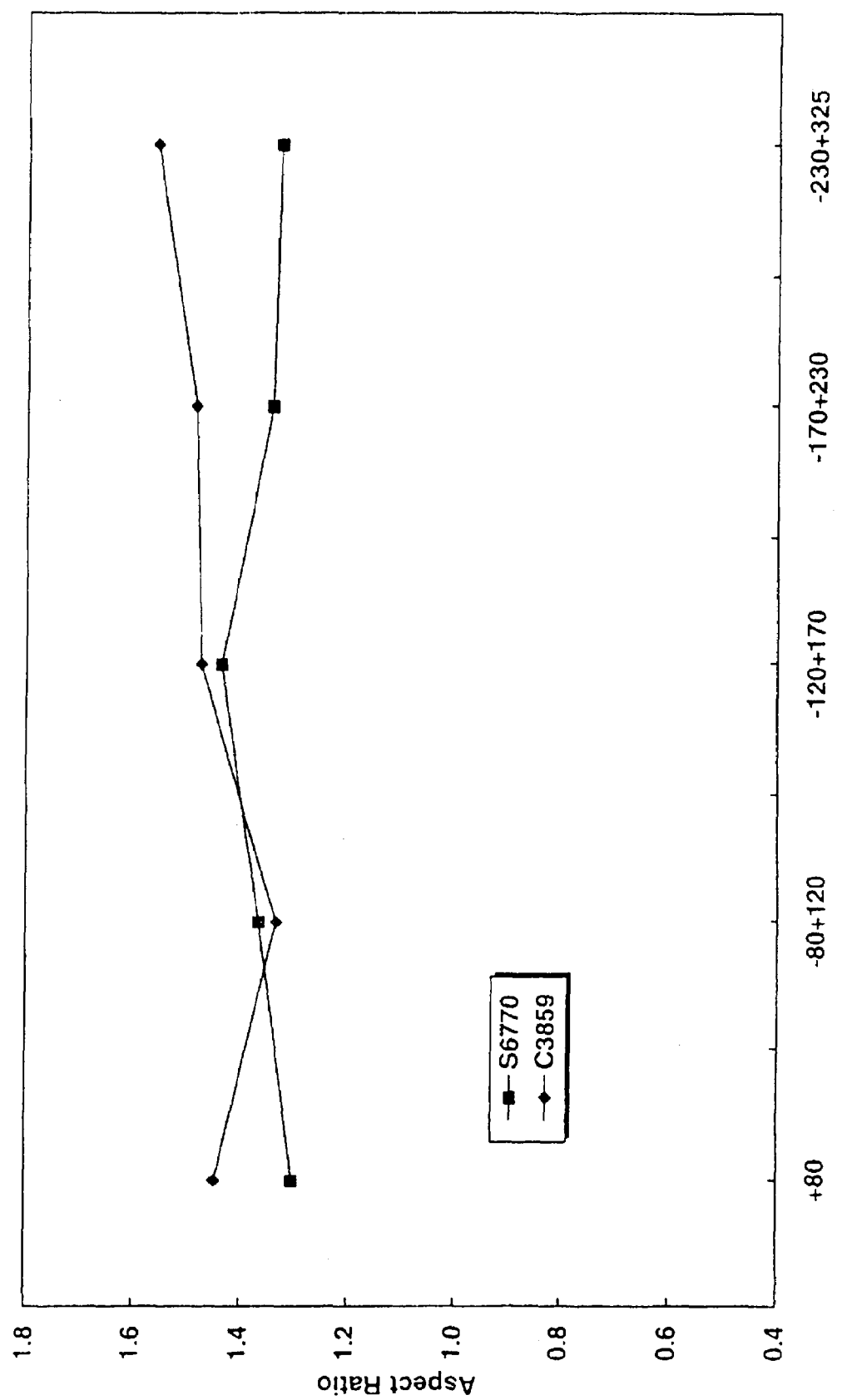
Figure 6:
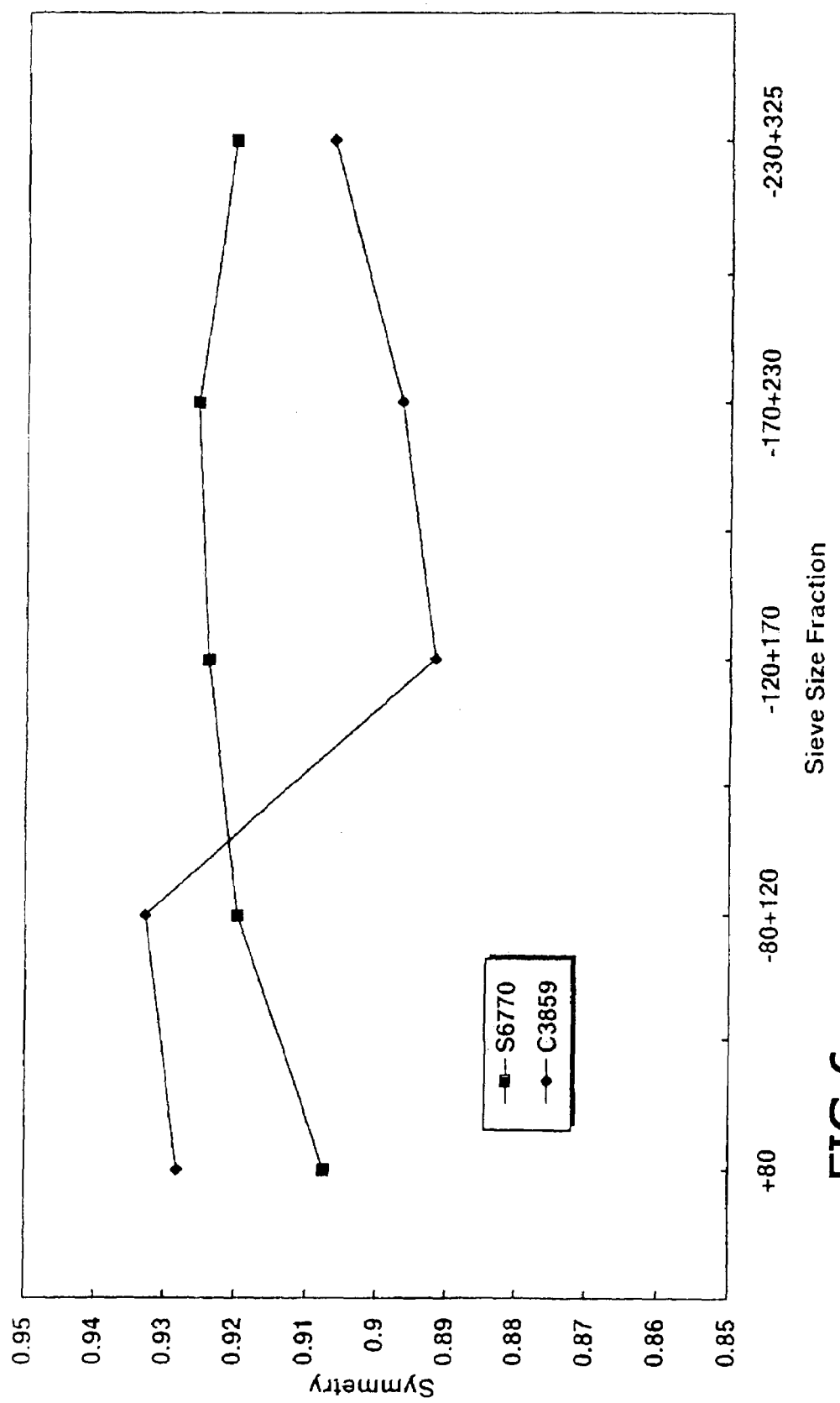

The aspect ratio of the processed silica is illustrated in FIG. 5. With regard to the size fraction from 45 to 63 microns, it will be seen that the processed silica has an aspect ratio of at least about 1.5, as compared with an aspect ratio of only about 1.35 for the weathered silica. Thus, in one preferred embodiment of this invention, the slurry of this invention contains less than about 10 weight percent of silica whose particles, in the range of from 45 to 63 microns, have an aspect ratio of at least 1.5. In this embodiment, it is preferred that less than about 5 weight percent of such silica have an aspect ratio of at least 1.5 within the range of from

TABLE 1

|  | S6770 | | | | | C3859 | | | | |
| --- | --- | --- | --- | --- | --- | --- | --- | --- | --- | --- |
|  | S6770 + 80 | −80 + 120 | −120 + 170 | −170 + 230 | −230 + 325 | C3859 + 80 | −80 + 120 | −120 + 170 | −170 + 230 | −230 + 325 |
| Elongation | | | | | | | | | | |
| average | 188.18 | 161.74 | 142.98 | 77.85 | 67.47 | 115.55 | 151.73 | 137.36 | 87.43 | 80.91 |
| min | 149.18 | 115.39 | 65.94 | 54.57 | 32.29 | 1.05 | 112.70 | 87.92 | 54.46 | 26.26 |
| max | 264.97 | 268.29 | 282.21 | 120.13 | 142.86 | 184.77 | 212.29 | 188.08 | 200.48 | 244.21 |
| Roundness | | | | | | | | | | |
| average | 0.651 | 0.653 | 0.634 | 0.681 | 0.660 | 0.660 | 0.692 | 0.584 | 0.586 | 0.548 |
| min | 0.484 | 0.451 | 0.426 | 0.384 | 0.452 | 0.598 | 0.547 | 0.381 | 0.331 | 0.226 |
| max | 0.809 | 0.782 | 0.815 | 0.849 | 0.867 | 0.749 | 0.794 | 0.782 | 0.809 | 0.774 |
| Aspect Ratio | | | | | | | | | | |
| average | 1.302 | 1.366 | 1.436 | 1.342 | 1.327 | 1.446 | 1.333 | 1.473 | 1.484 | 1.558 |
| min | 1.101 | 1.117 | 1.111 | 1.076 | 1.079 | 1.234 | 1.144 | 1.168 | 1.116 | 1.078 |
| max | 1.596 | 1.709 | 2.029 | 2.139 | 1.972 | 1.766 | 1.593 | 2.030 | 2.363 | 3.303 |
| Symmetry | | | | | | | | | | |
| average | 0.908 | 0.920 | 0.924 | 0.926 | 0.920 | 0.928 | 0.933 | 0.892 | 0.897 | 0.907 |
| min | 0.823 | 0.812 | 0.775 | 0.824 | 0.738 | 0.857 | 0.849 | 0.737 | 0.720 | 0.779 |
| max | 0.953 | 0.994 | 0.987 | 0.990 | 0.987 | 1.000 | 0.989 | 0.971 | 0.999 | 0.981 |

Figure 3:
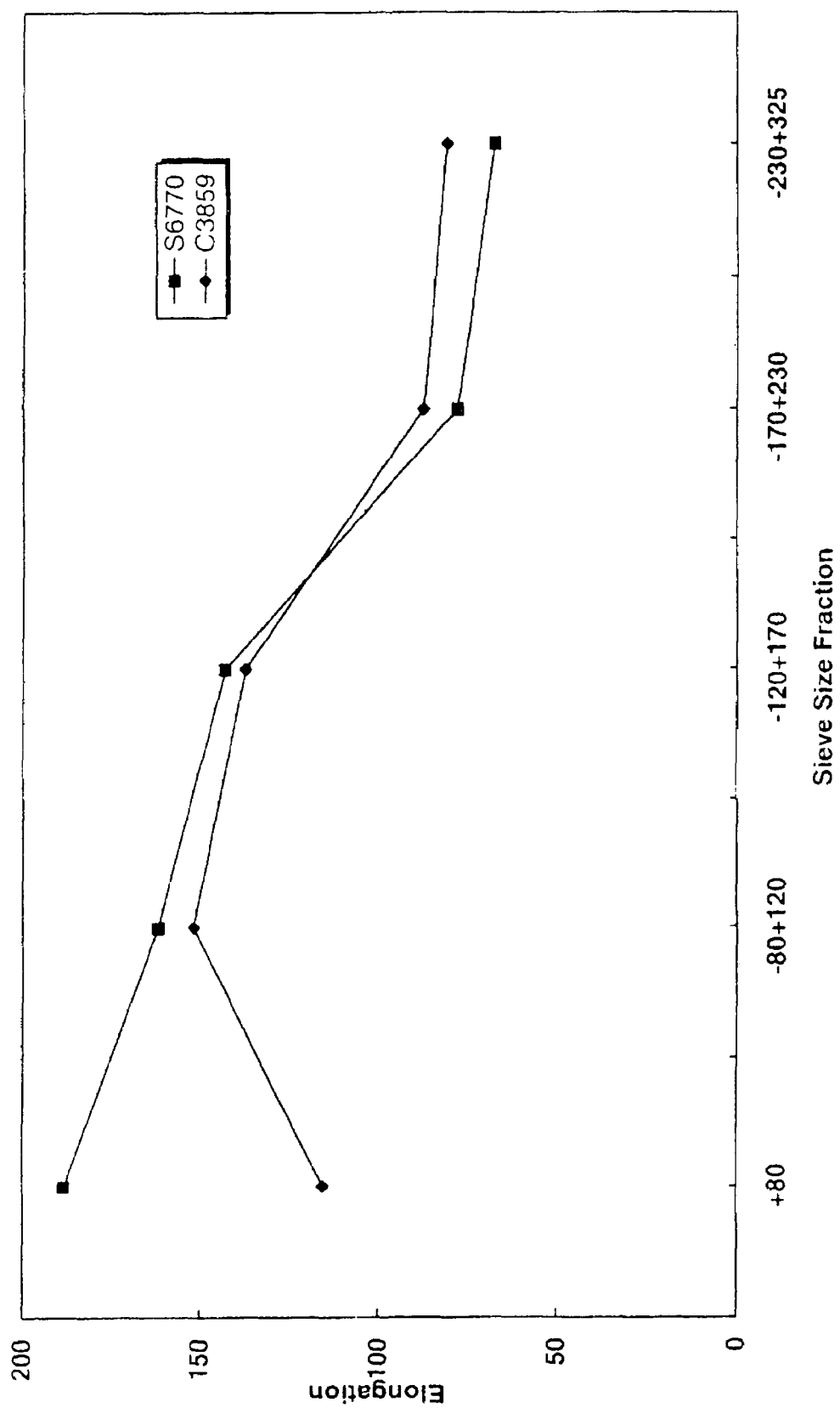
FIGS. 3, 4, 5, and 6 are graphs of the properties of different "weathered silicas" and a "ground silica."
Figure 4:
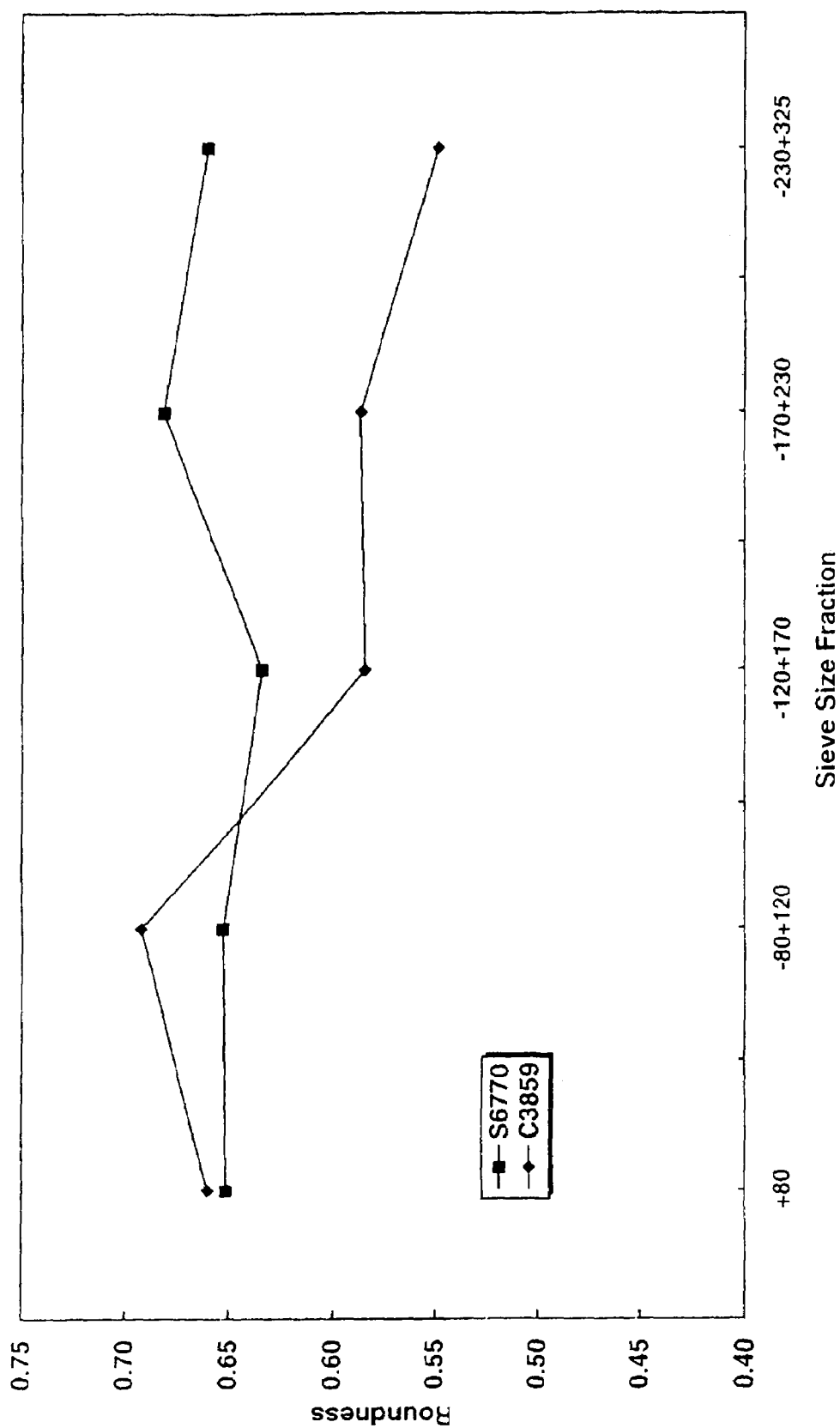

The data from this Table 1 is presented in FIGS. 3 (elongation), 4 (roundness), 5(aspect ratio), and 6(symmetry). Referring to these Figures, it will be seen that the commercially available ground silica (the C3859, sold by the Unimin Corporation) has substantially different properties than the "weathered silica."

The commercially available ground silica is hereinafter referred to as "processed silica." It is to be distinguished from the "fractured silica" mentioned in U.S. Pat. No. 5,096,733 (which is comprised of "silicon based radicals), although it may contain many of the same properties. What "processed silica" possesses, as is illustrated by, e.g., Table 1, are certain quantified physical properties.

Referring to Table 1, and FIGS. 3, 4, 5, and 6, and to the preferred embodiment depicted therein, it will be seen that the roundness of the processed silica sample in the range of particle sizes from 45 to 63 microns (−230 mesh to +325 mesh) is less than 0.6 and, in one embodiment, is less than about 0.55. Thus, in one preferred embodiment of this invention, the slurry of this invention contains less than about 10 weight percent of silica whose particles, in the range of from 45 to 63 microns, have a roundness of less than about 0.6. In this embodiment, it is preferred that less than about 5 weight percent of such silica have a roundness 45 to 63 microns. It is even more preferred, in this embodiment, that less than about 1 percent of such silica have an aspect ratio of at least 1.5 in the range of form about 45 to about 63 microns.

Referring again to U.S. Pat. No. 5,096,733, which describes and claims "fractured silica," it is disclosed in this patent that: "Vallyathan et al (Am. Rev. Respir. Dis., 138: 1213–1219 (1988)) have reported that freshly fractured silica exhibits surface characteristics and biological reactivity distinct from aged silica, that grinding of silica produced ~$10^{18}$ Si and Si—O (silicon based radicals per gram of dust) on the particulate surface, which were characterized by an electron spin resonance (ESR) spectrum centered around g=2.0015, and that these radicals react with aqueous media to produce OH radicals (demonstrated using a DMPO spin trap); that when compared to aged silica, freshly ground silica exhibits a greater cytotoxic effect on cellular membrane integrity (i.e., it showed a 1.5-fold increase in lactate dehydrogenase (LDH) release from macrophages, a 36-fold increase in hemolytic activity, and a 3-fold increase in the ability to induce lipid peroxidation as compared with aged silica)."

In one embodiment of this invention, the slurry of this invention contains less than about 10 weight percent of silica that contains about " . . . $10^{18}$ Si and Si—O silicon based radicals per gram of dust. . . . " In another embodiment of this invention, the slurry contains less than about 5 weight percent of silica that about " . . . $10^{18}$ Si and Si—O silicon based radicals per gram of dust. . . . " In yet another embodiment of this invention, the slurry contains less than about 1 weight percent silica that contains about " . . . $10^{18}$ Si and Si—O silicon based radicals per gram of dust. . . . "

Another Slurry of this Invention

In the preceding section of this specification, applicant has described one particular silicious slurry with a particular set of properties. In this section of the specification, applicant will describe another such slurry that differs from the first slurry.

The slurry of this embodiment of the invention is comprised of from about 65 to about 75 weight percent of solids, from about 54 to about 63 weight percent of silica, and less than about 0.4 weight percent of carbon; it has a settling index of at least 0.7 and a specific surface area of from about 8 to about 14 square meters per gram; and the ratio of silica to alumina in the slurry is from about 1.5 to about 1.9. Of the silica in the slurry, less than about 2 weight percent of it (by dry weight) is a silica selected from the group consisting of fractured silica, processed silica, and mixtures thereof.

The slurry of this embodiment of the invention also contains liquid and solids. The liquid is preferably an aqueous liquid, i.e., it is comprised of or consists essentially of water. In general, the liquid is comprised of at least about at least about 80 volume percent of water and, more preferably at least 90 volume percent of water. Other liquid components may be present in a minor amount (i.e., less than 20 volume percent), such as, e.g., poly(vinyl alcohol), glycerine, stearic acids, etc. These additives may be present as lubricants, or additives that change the surface tension of the liquid phase, as modifiers of the rheology of slurry, and the like.

In one embodiment, the other liquid component is an organic liquid.

In one preferred embodiment, the liquid used in the slurry is compatible with mold plaster such that, during slip casting, the passage of the liquid through the plaster mold does not substantially degrade the pores of the mold. In one aspect of this embodiment, the liquid is substantially inert with respect to the plaster and thus, as it is drawn through the pores in the plaster mold, tends not to degrade such pores. To this end, one of the components of the liquid phase of the slurry is preferably adapted to interfere with reaction between such liquid phase and the plaster.

In general, the slurry will preferably contain from about 65 to about 75 weight percent of solids (by total weight of solids and liquid in the slurry). In one embodiment, the slurry contains from about 69 to about 73 weight percent of solids.

The slurry preferably will have a settling index of at least about 0.7 and, preferably, at least about 0.75.

The slurry preferably contains from about 54 to about 63 weight percent of silica. In one embodiment, the slurry contains from about 54 to about 58 weight percent of silica.

The slurry preferably has a ratio of silica to alumina of from about 1.5 to about 1.9.

It is preferred that the carbon content of the slurry be less than about 0.4 weight percent. In one embodiment, the carbon content of the slurry is less than about 0.3 weight percent.

The slurry of this embodiment of the invention preferably has a specifc surface area of from about 8 to about 14 square meters per gram. The specific surface area may be measured by means well known to those skilled in the art. Reference may be had, e.g., to U.S. Pat. No. 5,153,155, the entire disclosure of which is hereby incorporated by reference into this specification. As is disclosed in this patent, "Specific surface area can be measured by nitrogen adsorption using the well known BET equation. This measurement can be conducted on a Micromeritics "Flow Sorb II 2300," model 2300/00000/00 (made by Micromeritics Company). The test procedure is described in the instruction manual for the machine (see, e.g., Manual P/N: 230/42804/00, published by Micromeritics in 1985)."

One Preferred Process for Making Applicant's Slurry

In the process illustrated in FIG. 1, a preferred process for preparing one embodiment of applicant's clay slurry is disclosed, in which the slurry is a ball clay slurry. This Figure is similar to the FIG. 1 of U.S. Pat. No. 4,880,759, the entire disclosure of which is hereby incorporated by reference into this specification.

Ball clays, as mined, are very heterogenous in those properties crucial to the production of a consistent ball clay slurry, from top to bottom and laterally throughout the mineral deposit. Thus, a single clay cannot readily produce ball clay slurry with consistent properties. Several deposits, or several locations within a single deposit, may be required to make ball clay slurries. For the purposes of this specification, each ball clay sample which displays unique properties is considered to be a separate ball clay, even if it came from the same deposit.

In one embodiment, applicant's preferred ball clay slurry is preferably blended, i.e., it is prepared by mixing two or more ball clays so that, to some extent, a blend is obtained in which the separate identify of the consists of two or more of the ball clays is lost. Thus, when two or more ball clay slurries are mixed, a blended slurry in which substantially only one ball clay consist exists is produced. Thus, e.g., the same result may be obtained when two ball clays are combined by dry mixing, or when ball clay is mixed with ball clay slurry. As will also be apparent, silicious kaolin slurries may also be made by such a blending process.

Prior to the time the ball clay (or the kaolin clay) is mixed with water and chemical(s), the properties of candidate clay(s) are preferably evaluated. Thus, for example, in one embodiment, at least two ball clays to be used from deposits 10 and/or 12 and/or 14 and/or 16 and/or 18 are sent first to lab 22 where specific properties are measured. In this embodiment, the ball clay is multicomponent, that is, it contains at least two ball clay consists. The slurry may be prepared, e.g., by mixing two ball clays and then adding liquid, by blending two ball clay-water mixtures, by mixing a ball clay with a ball clay slurry, and the like. In one preferred embodiment, described below, at least two ball clays are admixed before they are mixed with water. Such a blending process is illustrated, e.g., in U.S. Pat. No. 4,812,427, the entire disclosure of which is hereby incorporated by reference into this specification.

The measurements made upon the clays from deposits 10, 12, 14, 16, or 18 may include (1) chemical analysis, (2) particle size distribution, (3) pH of the clay, measured by a conventional pH meter, (4) deflocculation potential (measured by the deflocculation test described in U.S. Pat. No. 4,880,759) to determine how much deflocculant will bring it to minimum viscosity, (5) dry modulus of rupture of the clay, (6) fired color of the clay, which is determined by visual means, (7) specific surface area of the clay, and (8) other properties of the clay, such as soluble sulfate content and the amount of digesting agent to be added.

By way of illustration and not limitation, the amount of silica present in the ball clay also often is determined.

In one preferred embodiment, a 600 gram sample of ball clay from at least two of the deposits 10, 12, 14, 16, or 18 is tested in lab 22 to determine how much digesting agent should be added to the slurry. This test (the transmission test) is described in U.S. Pat. No. 4,880,759. It should be noted that, in the digestion of the ball clay, one may use alkali metal hydroxide (such as, e.g., sodium hydroxide or potassium hydroxide) instead of soda ash to digest the clay.

The soluble sulfate content of the ball clays to be used can be determined from A.S.T.M. test C-867-77. If the soluble sulfate content exceeds the amount required in the slurry, the sulfate content can easily be reduced by adding, e.g., barium carbonate in stoichiometric proportions. Thus, for example, 2.05 pounds of barium carbonate must be added for each pound of sulfate ion one wishes to retire from the slurry.

These preliminary evaluations may be used to determine which storage shed(s) the clays should be sent to. Such analysis allows one to determine, for any given desired slurry with specified properties, which, if any, ball clays to blend and how much, if any, of each ball clay should be blended. Because accurate sampling of large, dry, bulk quantities is difficult, such analysis only gives starting approximations of the final product.

After being analyzed in laboratory 22, clay from two or more of deposits 10, 12, 14, 16, and 18 are charged via line 24 to one or more of storage sheds 26, 28, 30, 32, and 34, according to the specifications of earlier material already stored in the shed(s).

In the description from this point on, the preparation process described refers to a method of making a ball clay-water slurry from clay contained in a hopper containing at least two ball clays. It is to be understood, however, that the same process could be used to prepare slurry from clay contained in a hopper containing only one ball clay. In the preferred embodiment, the ball clay slurry is multi-component, that is, it is prepared from at lest two ball clay consists, i.e., at least two ball clays with different particle size distributions.

In the process of this invention, it is preferred to utilize one or more ball clays that are "unprocessed." As used in this specification, the term "unprocessed" refers to a ball clay which has not been subjected to a temperature of at least about 200 degrees Fahrenheit.

Referring again to FIG. 1, clay from one or more of storage sheds 26, 28, 30, 32, and/or 34 is fed via line 36 to weigh hopper 38 and thence, via line 40, to roller-crusher 42. Feeding means well known to those skilled in the art can be used to convey the clay from the storage shed. Thus, e.g., one can use any of the conveying and/or feeding means described on page 7–4 of R. H. Perry and C. H. Chilton's "Chemical Engineer's Handbook," Fifth Edition, McGraw-Hill Book Company (New York, 1973) to convey the clay from the storage shed to weigh hopper 38 and roller crusher 42.

It is preferred, in one embodiment, that roller-crusher 42 reduce the lump size of the clay such that subantially all of the lumps of clay are 1.5 inches or finer.

As used in this specification, the term "hopper" refers to a vessel into which materials are fed, which usually is constructed in the form of an inverted pyramid or cone terminating in an opening through which the materials are discharged. Any of the hoppers known to those skilled in the art can be used in the process of this invention.

The clay to be used in the process is weighed, and a suitable amount of clay is fed so that 55,000 pounds of clay (dry basis) are in weigh hopper 38.

The clay from crusher 42 is fed via line 44 to blunger 46. As is used in this specification, the term "blunger" refers to a cylindrical vessel containing a rotating shaft with fixed knives useful for blunging. Blunging is the process of blending or suspending ceramic material in liquid by deagglomeration and agitation.

In one embodiment of the process of this invention, hot water, digesting agent, organic polyelectrolyte, sulfate adjusting agent, pH adjusting agent, and other desired chemical additives are added to blunger 46 via line 45. It is preferred that these reagents be fed into the blunger in a certain sequence. The organic polyelectrolyte used in the process is preferably not fed into the blunger until at least about 50 percent of the clay has been fed into the blunger and all of the digesting agent to be used has been added. Furthermore, if the soluble sulfate content of the ball clay is too high, it is preferred that the organic polyelectrolyte not be fed into blunger 46 until the soluble sulfate ion concentration has been reduced to the required level.

In one embodiment, some or all of the organic polyacrylate is replaced by an inorganic dispersing agent, such as sodium silicate.

A sufficient amount of water is fed into blunger 46 via line 45 so that, when the water has been mixed with all of the clay from hopper 38, a clay/water slurry with the required solids content will be produced. It is preferred that the water be hot, that it be at a temperature of from about 140 to about 200 degrees Fahrenheit. It is even more preferred that the water be at a temperature of from about 150 to about 190 degrees Fahrenheit. In an even more preferred embodiment, the water is at a temperature of from about 160 to about 180 degrees Fahrenheit. In the most preferred embodiment, the water is at a temperature of from about 165 to about 175 degrees Fahrenheit.

The required amount of digesting agent, if any, as determined by the test described in U.S. Pat. No. 4,880,759, is added to blunger 46 via line 45. Alternatively, or additionally, some or all of the digesting agent can be added with the water through line 45. In either event, it is preferred that the digesting agent and any sulfate adjusting agent used be added to blunger 46 in the form of aqueous solutions. In general, from about 0.0 to 0.1 percent, by weight of dry clay, of digesting agent is used in the process of the invention.

In one embodiment, it is preferred that all of the digesting agent required in the process be mixed with water in blunger 46 before any of the ball clay is charged to the blunger. Furthermore, it is preferred that at least half of the ball clay to be used in the process be mixed with water and the digesting agent prior to the time the organic polyelectrolyte is added to the blunger.

If the ball clay used in the process contains more than about 650 parts per million of soluble sulfate ion, then the clay may be mixed with a sulfate reducing agent prior to the time the polyelectrolyte (or sodium silicate) is added. The sulfate reducing agents that can be used include barium carbonate, barium monohydrate, barium octahydrate, mixtures thereof, and the like. The amount of sulfate reducing agent can be determined by stoichiometric calculation.

The ball clay from crusher 42 is fed into blunger 46 over a period of from 25 to about 120 minutes. It is preferred to feed the clay into the blunger over a period of from about 35 to about 90 minutes. In a more preferred embodiment, the clay is fed into the blunger over a period of from about 40 to about 60 minutes.

In one embodiment, organic polyelectrolyte and/or sodium silicate is fed into blunger 46 only after two things have occurred: (1) at least about 50 percent of the ball clay from hopper 38 has been fed into blunger 46, and (2) the mixture in blunger 46 becomes too viscous to effectively agitate.

During blunging, clay/water mixture from the bottom of blunger 46 is fed via line 52 to dump 70 for disposal.

In one embodiment, when the viscosity of the mixture in blunger 46 exceeds about 8,000 centipoise, then organic polyelectrolyte and/or sodium silicate is added to the blunger, condition (2) having occurred; this addition reduces the viscosity, and blunging and/or clay addition is continued until the viscosity again exceeds about 8,000 centipoise. The process is continued until all 55,000 pounds of the ball clay are blunged and the final viscosity of the mixture is about 200 centipoise or less at about 60 percent solids content.

If the Gallenkamp build-up is too high, and/or the Brookfield viscosity at 100 r.p.m. is too high, more organic (or inorganic) polyelectrolyte is added to the blunger. When the slurry in blunger 46 has the desired viscosity, solids content, and Gallenkamp build-up, as measured in laboratory 50, in one embodiment the slurry may be discharged via line 58 to scalper screen 60.

Scalper screen 60 is preferably a 30 mesh screen which removes oversize particles. Other suitable screens can be used to remove particles greater than about 600 microns. Thus, e.g., one can use any of the screening devices shown on pages 21–39 to 21–44 of the Perry and Chilton "Chemical Engineers' Handbook."

Slurry passing through scalper screen 60 may be passed via line 64 to finishing screen 66. Finishing screen 66 is preferably a 100 mesh mesh screen which removes all particles greater than 150 microns. The oversize from screen 66 usually contains coarse particles of undesirable sand and lignite, which material is transferred via line 68 to dump 70 for disposal.

Although only one scalper screen 60 and only one finishing screen 66 are shown in FIG. 1, a multiplicity of such screens can be used. Thus, in one embodiment, two scalper screens 60 and five finishing screens 66 are used.

In another embodiment, also illustrated in FIG. 1, an alternative screening apparatus 63 is used. This alternative screening apparatus is preferably a Spencer Strainer System sold by the Spencer Machine and Tool Company of Jeffersonville, Ind. and described, e.g., in U.S. Pat. No. 5,332,499. The entire disclosure of such U.S. patent is hereby incorporated by reference into this specification.

U.S. Pat. No. 5,332, 499 discloses and claims: "A self-cleaning filter for removing solid particles from a liquid slurry comprising agglomerates of solid particles, the self-cleaning filter comprising: a casing having an inlet for receiving material to be filtered and an outlet for discharging filtered material; a tubular filter screen disposed in the casing and having a length, a circumference, an exterior surface and an interior surface, the tubular filter screen being rotatable in a direction and forming an inlet chamber between the casing and the exterior surface in flow communication with the casing inlet and an outlet chamber within the interior surface in flow communication with the casing outlet, so that the slurry is filtered from the exterior surface of the tubular filter screen to the interior surface; first means for breaking-up a first portion of agglomerates deposited on the exterior surface of the tubular filter screen, forcing a first portion of the solid particles through the tubular filter screen, and suspending in the slurry a second portion of agglomerates deposited on the tubular filter screen, the first means comprising a first cleaning blade disposed in the inlet chamber and removably fixed to the casing, the first cleaning blade (1) having a leading edge biased against the exterior surface of the filter screen, (2) extending from a first blade holder toward the leading edge of the, first cleaning blade in a direction substantially opposing the direction of rotation of the tubular filter screen, and (3) extending along the length of the filter screen; a second means for catching and breaking-up the second portion of agglomerates and forcing a second portion of solid particles through the tubular filter screen, the second means comprising a second cleaning blade disposed in the inlet chamber and removably fixed to the casing, the second cleaning blade (1) having a leading edge biased against the exterior surface of the filter screen, (2) extending from a second blade holder toward the leading edge of the second cleaning blade in a direction substantially opposing the direction of rotation of the tubular filter screen, and (3) extending along the length of the filter screen, the second cleaning blade being spaced from the first cleaning blade at a position about the circumference of the tubular filter screen from about 75° to about 115° from the first cleaning blade; and means for rotating the tubular filter screen relative to the first and second cleaning blades."

Referring again to FIG. 1, the slurry from blunger 46 may be passed via line 61 to screening apparatus 63, and the screened slurry produced in such apparatus may then be fed via line 65 into surge tank 74.

Alternatively or additionally, the slurry which passes through finishing screen 66 may be fed via line 72 into surge tank 74. Samples of slurry are taken via line 76 to lab 78 for evaluation of specific properties. This slurry can later be blended with other ball clay/water slurries to obtain desired final blend properties. The specific properties evaluated in lab 78 are described below and are:

Specific Gravity—The specific gravity of the slurry, in one embodiment, should be from about 1.585 to about 1.684.

Gallenkamp Build-Up—It is preferred that the build-up be from about 65 to about 100 degrees.

Casting Rate—The casting rate should be from about 60 to about 160 grams in one hour.

In one embodiment, the screening of the slurry should be adequate to produce a slurry with the specific surface area particle size distribution discussed below.

In one embodiment, the specific surface area of the slurry is less than about 16 square meters per gram. In one aspect of this embodiment, such specific surface area is from about 14 to about 15.4 square meters per gram. In another aspect of this embodiment, such specific surface area is from about 16 to about 19 square meter per gram.

In one embodiment, from about 27 to about 51 percent of the particles in the slurry are smaller than 1 micron.

In one embodiment, from about 36 to about 60 percent of the particles in the slurry are smaller than 2 microns.

In one embodiment, from about 48 to about 72 percent of the particles in the slurry are smaller than 5 microns.

In one embodiment, from about 53 to about 82 percent of the particles in the slurry are smaller than 10 microns.

It is preferred also to conduct analyses of slurry particles greater than 45 microns by conventional sieve analyses, as is described at pages 21–44 to 21–45 of Robert H. Perry et al.'s "Chemical Engineer's Handbook," Fifth Edition (McGraw-Hill Book Company, New York, N.Y., 1973). It is preferred to use a Ro-Tap testing sieve shaker (see FIG. 21–56 of the Perry et al. text) manufactured by the W. S. Tyler Company. In utilizing the test procedure, it is preferred to use certain U.S. Standard sieve series, to wit: 80 mesh, 120 mesh, 170 mesh, 230 mesh, and 325 mesh, which corresponds to, respectively, opening sizes of 180 microns, 125 microns, 90 microns, 63 microns, and 45 microns.

It is preferred that the screening be conducted so that the slurry have one or more of the particle size distributions described below.

In one embodiment, at least about 98 percent of the particles in the slurry percent of the particles in the slurry are smaller than 180 microns.

In one embodiment, at least about 90 percent of the particles in the slurry are smaller than 125 microns.

In one embodiment, at least about 83 percent of the particles in the slurry are smaller than 90 microns.

In one embodiment, at least about 75 percent of the particles in the slurry are smaller than 63 microns.

In one embodiment, at least about 68 percent of the particles in the slurry are smaller than 45 microns.

Figure 2:
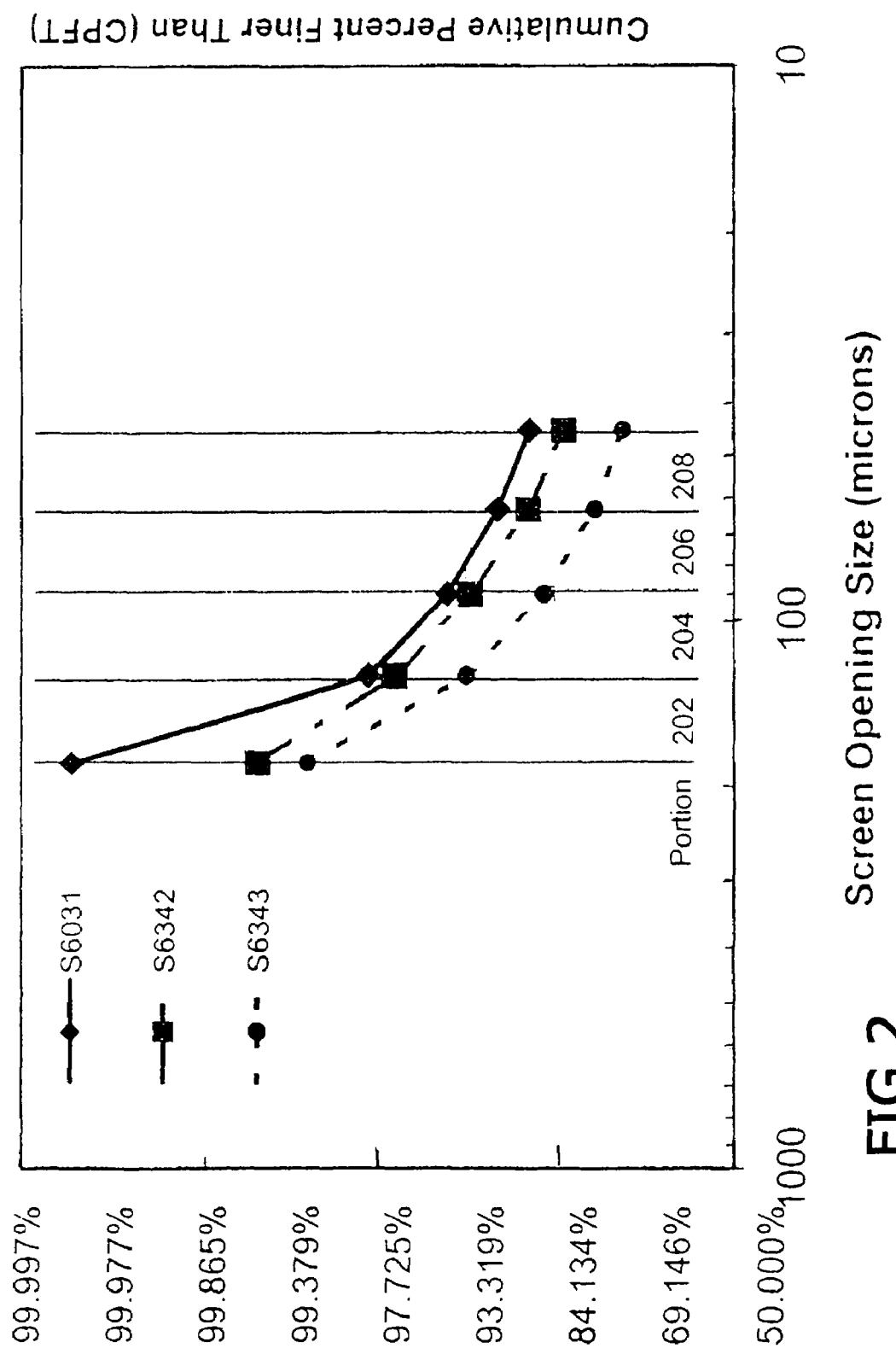
FIG. 2 is a graph of one preferred particle size distribution of a portion of one preferred slurry of the invention.

FIG. 2 is a plot of CPFT ("cumulative percent finer than, in terms of solids) versus particle size (in microns). The plot was made using log (for the particle size) versus normal (for the CPFT plot), in accordance with the well-known binomial probability equation (see, e.g., Example 1 of U.S. Pat. No. 4,817,446, the entire disclosure of which is hereby incorporated by reference into this specification.).

Referring to FIG. 2, it will be seen that data has been plotted for three separate samples, slurries S6031, S6342, and S6343. For each of these plots, a portion 202 of the curve extends from 180 microns to 125 microns. In general, the slope of these curves 202 ranges from about 4.5 to about 11. In particular, for the samples tested, the slopes were 10.54, 4.90, and 5.67, respectively.

Referring again to FIG. 2, it will be seen that a portion 204 of the curve extends from 125 microns to 90 microns. In general, the slope of these curves 204 ranges from about 2.6 to about 3.4. In particular, for the samples tested, the slopes were 3.10, 2.99, and 3.08, respectively.

Referring again to FIG. 2, it will be seen that a portion 206 of the curve extends from 90 microns to 63 microns. In the general, the slope of these curves 206 ranges from about 1.75 to about 2.25. In particular, for the samples tested, the slopes were 1.86, 2.11, and 1.84, respectively.

Referring again to FIG. 2, and in the preferred embodiment depicted, it will be seen that a portion 208 of the curves extends from about 90 microns to about 63 microns. In general, the slope of these curves 208 ranges from about 1.0 to about 1.5. In particular, for the samples tested, the slopes were 1.24, 1.39, and 1.10, respectively.

As will be appreciated by those skilled in the art, the data presented is only illustrative of three particular slurries; and other slurries within the scope of the invention may have different configurations.

In one embodiment, the slope each of the portions 202, 204, 206, and 208, for each separate plot, are within about plus or minus 10 percent of the slopes for each of such other portions, in which case one is able to draw a substantially straight line form the 180 micron point to the 45 micron point.

In one preferred embodiment, the ball clay slurry of this invention has a loss on ignition of less than 6.9 and, preferably, less than about 6.7. In one embodiment, the loss on ignition of the ball clay is less than about 6.5. In another embodiment, the loss on ignition of the ball clay is less than about 6.0. The loss on ignition property of a clay may be determined in accordance with A.S.T.M. test C323, "Chemical Analysis of Ceramic Whiteware Clays."

In one embodiment, the ball clay slurry of this invention contains less than about 0.7 weight percent of total carbon, dry weight, by dry weight of solids in the slurry. As will be apparent, the total carbon includes both "organic carbon" and "inorganic carbon."

In one embodiment, the ball clay slurry of this invention contains less than about 5 weight percent of such fractured silica, and/or such processed silica, by dry weight. In another embodiment, the ball clay slurry of this invention contains less than about 1 weight percent of such fractured silica.

The slurry from surge tank 74 is preferably passed via line 80 through electromagnetic filter 82 to remove magnetic particles from the slurry. The slurry is then passed via line 84 to one of agitated storage tanks 86, 88, or 90.

The slurry of this invention can be prepared from different clays with different properties using the process of FIG. 1, and some or all of the slurries can then be blended to produce a slurry with final properties. For example, a single clay from storage shed 18 may finally be placed in the slurry tank 90. Tanks 86 and 88 may contain slurries with different properties, from different sheds, all determined in lab 78. Based on these properties, the specific proportions from 86, 88, and 90 may be blended via line 96 and volumetric pump (not shown) into final storage tank 98. The specific additional properties measured in lab 94 are:

a. Particle Size Distribution—The CPFT at 5 microns, 2 microns, and 1 micron are determined from the Sedimentometry Analysis described in U.S. Pat. No. 4,880,759.

b. Specific Surface Area—The S.S.A. of the solid fraction of the slurry is measured as described in U.S. Pat. No. 4,880,759.

c. Sieve Analysis is conducted as discussed elsewhere in this specification.

Using these data, and the data from lab 78, in a linear optimization program the final properties of the blended slurry are predicted. The final slurry is then blended from tanks 86, 88, and 90 and passed via line 96 into final slurry tank 98. Final evaluation of all pertinent properties is then repeated in lab 102.

Properties of One Preferred Ball Clay/Water Slurry

The ball clay/water slurry of this invention, in one embodiment, is preferably prepared from at least two other ball clay/water slurries. In one embodiment, the slurry is prepared by blending at least three ball clay/water slurries; this embodiment is illustrated in the Examples of U.S. Pat. No. 4,880,759.

In order to be able to consistently obtain a ball clay slurry with the unique and rather specific combination of properties possessed by applicant's slurry, the wet blending of at least two ball clay slurries is preferred.

In one embodiment, the ball clay slurry of this invention comprises from about 58 to about 68 percent (by total weight of slurry) of ball clay (dry basis) and from about 42 to about 32 percent (by total weight of slurry) of water. It is preferred that the slurry contain from about 60 to about 66 percent (by weight of slurry) of ball clay and from about 40 to about 34 weight percent of water. In a more preferred embodiment, the slurry contains from about 63 to about 64.5 percent by weight, of ball clay, and from about 37 to about 35.5 percent, by weight, of water.

Unless otherwise specified in this case, the weight of ball clay in the slurry is on a substantially moisture-free ("dry") basis. Clay material is considered to be "dry" when it has substantially zero percent moisture. A 500 gram sample of ball clay which is dried at 105 degrees Centigrade for 12 hours is considered to be "dry" for the purposes of this specification. As is well known to those skilled in the art, larger samples of ball clay will require longer drying times and/or higher temperatures.

If the solids content of the ball clay/water slurry is outside of the desired range, the viscosity stability and/or the particle stability and/or the flow rate of the slurry will often be unacceptable.

In one embodiment, ball clay slurry of this invention is comprised of from about 0.001 to about 1.0 percent of organic polyelectrolyte, calculated on the weight of the active ingredient in the polyelectrolyte by the weight of the dry ball clay in the slurry. It is preferred that the slurry comprise from about 0.01 to about 0.5 percent of organic polyelectrolyte and, more preferably, from about 0.1 to about 0.4 percent of said polyelectrolyte. In the most preferred embodiment, the slurry is comprised of from about 0.15 to about 0.3 percent of organic polyelectrolyte.

The organic polyelectrolyte used in the slurry of this embodiment of the invention preferably has a molecular weight of from about 1,400 to about 6,000 and, preferably, from about 2,300 to about 4,300. In a more preferred embodiment, the molecular weight is from about 3,000 to about 3,800. In the most preferred embodiment, the molecular weight is from about 3,300 to about 3,500.

The molecular weight of the organic polyelectrolyte may be determined by means well known to those skilled in the art. Thus, by way of illustration and not limitation, the molecular weight may be determined by gel permeation chromatography instrumentation operated in a size exclusion separation function. Suitable apparatus includes, e.g., a Perkin Elmer HPLC system.

It is preferred that the organic polyelectrolyte used in the slurry of this invention have at least one site on each recurring structural unit which, when the polyelectrolyte is in aqueous solution, provides an electrical charge. In one embodiment, the organic polyelectrolyte has at least two such sites per recurring unit.

It is preferred that the organic polyelectrolyte be a polymeric polycarboxylate, as is described in U.S. Pat. No. 4,880,759.

In one embodiment, some or all of the organic polyelectrolyte is replaced by inorganic dispersing agent, such as, e.g., sodium silicate.

In one embodiment, in addition to containing the organic polyelectrolyte, the ball clay slurry may additionally, or alternatively contain from about 0.1 to about 7.0 percent, by weight of dry ball clay, or at least one humic substance selected from the group consisting of humic acid, humate, and mixtures thereof. It is preferred that the slurry contain from about 0.3 to about 3.0 percent of said humic substance. In an more preferred embodiment, the slurry contains from about 0.5 to about 2.5 percent of said humic substance.

In one preferred embodiment, the preferred humic substance is a metal humate selected from the group consisting of sodium humate, potassium humate, ammonium humate, calcium humate, and mixtures thereof.

In one embodiment, the humic substance(s) is provided to the ball clay slurry by the digestion of digestible organic matter. In another embodiment, the humic substance(s) is provided to the slurry by the addition of said substance to the slurry.

If the humic substance(s) is to be provided to the ball clay slurry by digestion, one can use the digestible organic matter test to determine how much digesting agent should be added to the slurry. This test is different from the determination of the organic content in the ball clay. The test determines if the organic matter is digestible and, thus, is useful to the slurry properties. In this test, 600 grams of the ball clay are mixed with 400 grams of hot water, which is at a temperature of at least 150 degrees Fahrenheit. To this mixture is then added a 20 weight percent solution of soda ash; this solution is added in ten-drop increments. After each ten-drop increment of the soda ash has been added to the mixture, the mixture is stirred for two minutes with a Lightning Model V-7 Mixer ("Lightning Mixer") which is manufactured by the Mixing Equipment Company of Rochester, N.Y.; the viscosity of the stirred mixture is then determined on a Brookfield viscometer equipped with a number 3 spindle operated at 100 revolutions per minute; and the transmission of the stirred slurry is determined in accordance with the transmission test described elsewhere in this specification.

If the viscosity decreases from a first to a later incremental sample, or if the transmission decreases, then the ball clay being tested contains digestible organic matter. In general, it is desired that the transmission of the slurry filtrate not be below about 70 percent, although a slurry whose transmission is at least about 60 percent sometimes is suitable for certain purposes. Thus, when the addition of the digesting agent (such as soda ash) finally results in a slurry whose transmission is below the required level, one knows that maximum amount of the particular digesting agent which can be used in the process: the total amount of digesting agent which will give minimum viscosity without reducing the transmission below the required level should be used to digest the ball clay.

If the ball clay to be used in the process does not contain from about 0.1 to about 7.0 percent, by weight of dry clay, of digestible organic matter, one or more commercially available digested organic materials can be mixed with the clay, water, and polyelectrolyte. Thus, by way of illustration, one can add from about 0.1 to about 7.0 percent of "Supertreat" and/or "Carbonox" and/or other similar substances. These humic substances have variable high molecular weights. Without wishing to be bound to any particular theory, applicant believes that they serve as auxiliary dispersant when converted to the alkali form. It is possible that small quantities of other high molecular weight dispersants may be substituted as similar substances.

Those skilled in the art are well aware of the various humic substances which are commercially available. Thus, e.g., "Supertreat" is sold by the American Colloid Company of Skokie, Ill. Thus, e.g., "Carbonox" is sold by N. L. Industries of Highstown, N.J.

In one alternative embodiment, described in applicant's U.S. Pat. No. 6,696,377 (the entire disclosure of which is hereby incorporated by reference), there is disclosed a process in which a digested lignite material is added to the blunger.

The process claimed in U.S. Pat. No. 6,696,377 involves a process for preparing a ball clay slurry with a casting rate of at least about 50, a modulus of rupture of at least 500 pounds per square inch, and from about 0.1 to about 1.0 weight percent of organic polyelectrolyte.

In the process of U.S. Pat. No. 6,696,377, the following steps are involved: (a) mixing water and lignite to produce a lignite and water mixture, wherein from about 3 to about 4 weight percent of said lignite, by weight of said water is mixed with said water; (b) adjusting the pH of said lignite and water mixture with a pH adjusting material until said pH is at least about 9; (c) mixing said lignite and water mixture with lignitic coarse ball clay, thereby producing a mixture of lignitic coarse ball clay, lignite, and water, wherein: i. said lignitic coarse ball clay is comprised of from about 20 to about 40 weight percent of particles finer than about 0.5 microns and has a specific surface area of from about 13 to about 18 square meters per gram, and ii. said lignitic coarse ball clay is comprised of from about 1 to about 5 weight percent of organic matter, (d) adding to said mixture of lignitic coarse ball clay, lignite, and water, additional materials including organic polyelectroylate, non-lignitic coarse clay, and lignitic fine clay, thereby forming a blunge mixture, wherein: i. said mixture contains from about 15 to about 25 weight percent of said lignitic coarse ball clay, from about 25 to about 40 weight percent of said non-lignitic coarse clay, and from about 40 to about 50 weight percent of said lignitic fine ball clay, by total weight of said lignitic coarse ball clay, said non-lignitic coarse ball clay, and said lignitic fine ball clay, ii. said non-lignitic coarse ball clay has a speclflc surface area of from about 13 to about 18 square meters per gram, iii. said lignitic fine ball clay is comprised of from about 50 to about 70 weight percent—of particles finer than 0.5 microns, and it has a specific surface area of from about 20 to about 35 square meters per gram, and iv. from about 0.1 to about 0.26 weight percent of organic polyelectroLyte (weight of active ingredient by total dry weight of said lignitic coarse ball clay, non-lignitic coarse ball clay, and lignitic fine ball clay) is added to said mixture of lignitic coarse ball clay, non-lignitic coarse ball clay, lignitic fine ball clay, lignite and water; and (e) mixing said blunge mixture for at least about 30 minutes."

As will be apparent to those skilled in the art, one or more of the features of U.S. Pat. No. 6,696,377 may be incorporated into the process of the instant invention.

In one embodiment, the slurry of this invention is comprised of from about 50 to about 650 parts per million (by weight of dry ball clay) of flocculating ions. Some of the flocculating anions which may be used include, e.g., sulfate ion, carbonate ion, chloride ion, and mixtures thereof.

These flocculating anions are also necessarily accompanied by the cations of the various soluble salts which commonly are found in clay deposits. The most common dissolved salt found is gypsum or calcium sulfate. These flocculants both hinder and enhance slurry properties. In excess, they prevent proper deflocculation to the targeted low viscosity. In correct concentrations, they react with the polymeric polyelectrolytes to provide the correct gellation; it is believed that this correct gellation is strongly but not exclusively responsible for the flow index and settling index and casting rate properties of the slurry. Measurement of the flocculant cations is extremely difficult. Measurement of the accompanying molar equivalent of anion, such as sulfate, is relatively simple.

In one preferred embodiment, the flocculating ion is soluble sulfate ion. In this embodiment, it is preferred that the ball clay slurry comprise from about 250 to about 550 parts per million (by weight of dry ball clay) of soluble sulfate ion. In another embodiment, the ball clay slurry comprises from about 300 to about 400 parts per million of soluble sulfate ion.

If the level of soluble sulfate ion in the slurry is too high, one may blend the slurry with another slurry so that the blended slurry has the required concentration of soluble sulfate ion. Alternatively, or additionally, one can add soluble sulfate ion reducing agent(s) to the slurry. Thus, e.g., one can add such agents as barium carbonate, hydroxides of barium, mixtures thereof, and the like. Alternatively, one can dry blend several clays to modify the soluble sulfate level, and then blend the clay mixture with liquid to produce the slurry.

If the level of soluble sulfate ion in the slurry is too low, one may blend the slurry with another slurry so that the blended slurry has the required concentration of soluble sulfate ion. Alternatively, or additionally, one can add soluble sulfate increasing agents such as, e.g., calcium sulfate, sodium sulfate, aluminum sulfate, mixtures thereof, and the like. In addition, one may also use dry blending to produce a clay mixture with the required soluble sulfate content.

In one embodiment, the ball clay/water slurry described above, in addition to containing organic polyelectrolyte, also contains one or more inorganic electrolytes. Suitable inorganic electrolytes are well known to those skilled in the art. Thus, by way one may use electrolytes such as sodium silicate, sodium hexametaphosphate, tetra sodium pyrophosphate, and the like.

From about 0.001 to about 1.0 weight percent of the inorganic electrolyte (by dry weight of clay, dry basis) is present in the slurry, in addition to the 0.001 to about 1.0 weight percent of organic polyelectrolyte. It is preferred that the slurry comprise from about 0.01 to about 0.5 weight percent of inorganic electrolyte and from about 0.001 to about 0.5 weight percent of said organic polyelectrolyte. When the amounts of organic polyelectrolyte and inorganic electrolyte are combined, the total amount of these ingredients is equal to a concentration of from about 0.01 to about 1.0 weight percent (by weight of dry ball clay, dry basis).

The weight/weight ratio of organic polyelectroyte/inorganic electrolyte in the slurry is preferably from about 0.001 to about 999. In one embodiment, it is preferred that said weight/weight ratio be from about 0.01 to about 99. In this embodiment, it is more preferred that the weight/weight ratio be from about 0.05 to about 10 and, preferably, from about 0.1 to about 6.0. In a more preferred embodiment, said ratio is from about 0.2 to about 4.0. In an even more preferred embodiment, said weight/weight ratio is from about 0.33 to about 3.0. In another embodiment, said ratio is from about 0.5 to about 2.0.

Sodium silicate is one preferred inorganic electrolyte. As is known to those skilled in the art, such sodium silicate is readily available. Thus, as is disclosed on pages 460–461 of D. J. De Renzo's "Ceramic Raw Materials," (Noyes Data Corporation, Park Ridge, N.J., 1987), sodium silicate may be obtained from Cometals, Inc. (of One Penn Plaza, Suite 4901, New York, N.Y. 10019), from ICD Group, Inc (641 Lexington Avenue, New York, N.Y., 10022), or from other suppliers well known to those skilled in the art.

EXAMPLES

The following examples are presented to illustrate the claimed invention but are not to be deemed limitative thereof. Unless otherwise specified, all parts are by weight, and all temperatures are in degrees Celsius.

Example 1

A highly-silicious crude clay from Gleason, Tenn., called "Chappell Sand Seam," was used in this experiment and designed as "S6148." The clay contained 33.75 percent particles smaller than 44 microns, it had a specific surface area of 11.05 square meters per gram, and it contained 27.4 percent of its particles smaller than 0.5 microns. The clay contained at least 66 weight percent of silica.

Another clay from Henry County, Tenn. was also used in the experiment of this example. The second clay, designated as "S6153," contained 4.58 percent particles larger than 44 microns, a specific surface area of 27.7 square meters per gram, and it contained 21.4 percent of its particles smaller than 0.5 microns. The clay contained 64.4 weight percent of silica.

An 80/20 mixture of the first/second clay was prepared by first adding the second clay (S6153) to hot water at a temperature of 65 degrees Celsius with blunging, and with the addition of 0.034 percent (by weight) sodium carbonate. After the second clay was added to the blunger, then the first the clay (S6148) was added to the blunger while 0.168 weight percent of sodium polyacrylate dispering agent was added during the addition.

The slurry so produced (slurry S6343, see FIG. 2) had a specific gravity of 1.654, and it contained 23.7 weight percent of particles smaller than 0.5 microns. The slurry had a specific surface area of 13.75 square meters per gram, a casting rate of 148.3 grams per hour. The slurry contained at least 65.4 weight percent of silica. It contained 0.433 weight percent of carbon.

Examples 2–3

The procedure of Example 1 was substantially followed, with the exception that different clays were used. These different clays are described in Table 2.

TABLE 2

| Sample ID | Formula | SpecGrav | % < 0.5 um | SSA | SiO$_2$ | +325 mesh | % carbon | casting rate |
|---|---|---|---|---|---|---|---|---|
| S6467 | 25% | | 25.7 | 12.39 | 68.2 | 23.73 | | |
| S6591 | 25% | | 29.8 | 13.59 | 61.7 | 29.52 | | |
| S5759 | 30% | | 29.7 | 14.52 | 62.5 | 15.21 | | |
| S6199* | 20% | | 31.6 | 29.58 | 64.0 | 2.94 | | |
| S6602** | | 1.655 | 30.0 | 17.19 | 65.5 | 19.88 | 0.374 | 112.9 |

*includes portions of S6152 and S6153
**S6602 slurry was made using 0.286% sodium silicate

| S6771 | 25% | | 46.7 | 18.09 | 66.4 | 12.67 | | |
| S6770 | 25% | | 26.3 | 10.19 | 69.3 | 40.53 | | |
| S6796 | 20% | | 38.6 | 18.3 | 63.9 | 17.90 | | |
| S6797 | 30% | | 37.9 | 16.81 | 63.2 | 5.56 | | |
| S7145** | | 1.610 | 39.0 | 16.49 | 62.7 | 16.49 | 0.464 | 88.7 |

**S7145 slurry was made using 1.60% digested organic in NaOH and 0.147% sodium polyacrylate.

Referring to Table 2, and in the experiment of Example 2, it will be seen clays S6467, S6591, S5759, and mixed sample of S6199 and S6152 and S6153 were mixed together and blunged in accordance with the procedure of Example 1 to produce the the slurry of this example (S6602). The slurry had a specific gravity of 1.655, contained 30 percent of particles smaller than 0.5 microns, had a specific surface area of 17.9 square meters per gram, contained 65.5 weight percent of silica.

Referring to Table 2, and in the experiment of Example 3, it will be seen clays S6771, S6770, S6796, and S6797 were mixed together and blunged in accordance with the procedure of Example 1 to produce the slurry of this example (S7145). The slurry had a specific gravity of 1.610, contained 39 percent of particles smaller than 0.5 microns, had a specific surface area of 16.49 square meters per gram, contained 62.7 weight percent of silica.

It is to be understood that the foregoing description and examples are illustrative only and that changes can be made in the ingredients and their proportions and in the sequence and combinations of process steps as well as in other aspects of the inventions discussed without departing from the scope of the invention as defined in the following claims.

I claim:

1. A clay slurry with a solids content of at least about 60 weight percent and a casting rate of at least 60 grams per hour, wherein said slurry contains from about 68 to about 74 weight percent of silica and less than about 0.8 percent of carbon, wherein at least about 9 weight percent of the particles in said slurry are larger than about 44 microns, and wherein at least about 5 weight percent of the particles in said slurry are larger than about 74 microns.

2. The clay slurry as recited in claim 1, wherein said slurry has a settling index of at least 0.5.

3. The clay slurry as recited in claim 1, wherein said slurry has a settling index of at least 0.7.

4. The slurry as recited in claim 3, wherein said slurry has a solids content of from about 60 to about 66 percent.

5. The slurry as recited in claim 4, wherein said slurry contains at least about 72 weight percent of silica.

6. The slurry as recited in claim 1, wherein said slurry contains less than about 0.6 weight percent of carbon.

7. The slurry as recited in claim 4, wherein at least 10 percent of the particles in such slurry are larger than about 44 microns.

8. The slurry as recited in claim 7, wherein at least 6 percent of the particles in said slurry are larger than about 74 microns.

9. The slurry as recited in claim 1, wherein said slurry has a loss upon ignition of from about 5.0 to about 8.0 percent.

10. The slurry as recited in claim 2, wherein said slurry has a loss upon ignition of from about 5.0 to about 8.0.

11. A clay slurry with a solids content of at least about 60 weight percent and a casting rate of at least 60 grams per hour, wherein said slurry contains from about 68 to about 74 weight percent of silica and less than about 0.8 percent of carbon, wherein at least about 9 weight percent of the particles in said slurry are larger than about 44 microns, wherein at least about 5 weight percent of the particles in said slurry are larger than about 74 microns, and wherein said slurry contains less than about 5 weight percent of fractured silica.

12. A clay slurry with a solids content of at least about 60 weight percent and a casting rate of at least 60 grams per hour, wherein said slurry contains from about 68 to about 74 weight percent of silica and less than about 0.8 percent of carbon, wherein at least about 9 weight percent of the particles in said slurry are larger than about 44 microns, wherein at least about 5 weight percent of the particles in said slurry are larger than about 74 microns and wherein said slurry contains less than about 5 weight percent of processed silica.

13. The clay slurry as recited in claim 12, wherein said processed silica, in the particle size range of from 45 to 63 microns, contains particles with a roundness of less than about 0.6.

14. The clay slurry as recited in claim 12, wherein said processed silica, in the particle size range of from 45 to 63 microns, contains particles with an aspect ratio of at least about 1.5.

15. The clay slurry as recited in claim 1, wherein said slurry is a ball clay slurry.

16. The clay slurry as recited in claim 15, wherein said ball clay slurry is comprised of organic polyacrylate dispersing agent.

17. The clay slurry as recited in claim 15, wherein said ball clay slurry is comprised of sodium silicate dispersing agent.

18. The clay slurry as recited in claim 15, wherein said slurry is comprised of less than about 650 parts per million of soluble sulfate ion.

19. The clay slurry as recited in claim 15, wherein said slurry has a Gallenkamp build up of from about 65 to about 100 degrees.

20. The clay slurry as recited in claim 15, wherein said slurry has a casting rate of from about 160 grams in one hour.

21. The clay slurry as recited in claim 15, wherein said slurry has a specific surface area of less than about 16 meters per gram.

22. The clay slurry as recited in claim 15, wherein said slurry has a specific surface area of from about 16 to about 19 square meters per gram.

23. The clay slurry as recited in claim 15, wherein from about 27 to about 51 weight percent of the particles in the slurry are smaller than about 1 micron.

24. The clay slurry as recited in claim 15, wherein from about 36 to about 60 weight percent of the particles in the slurry are smaller than 2 microns.

25. The clay slurry as recited in claim 15, wherein from about 48 to about 72 weight percent of the particles in the slurry are smaller than 5 microns.

26. The clay slurry as recited in claim 15, wherein from about 53 to about 82 percent of the particles in the slurry are smaller than 10 microns.

27. The clay slurry as recited in claim 15, wherein at least about 98 percent of the particles in the slurry are smaller than 180 microns.

28. The clay slurry as recited in claim 15, wherein at least about 90 percent of the particles in the slurry are smaller than 90 microns.

29. The clay slurry as recited in claim 15, wherein at least about 75 percent of the particles in the slurry are smaller than 63 microns.

30. The clay slurry as recited in claim 15, wherein at least about 68 percent of the particles in the slurry are smaller than 45 microns.

31. The clay slurry as recited in claim 1, wherein said slurry has a loss on ignition of less than 6.9 percent.

* * * * *